(12) United States Patent
Mohan et al.

(10) Patent No.: US 11,288,147 B2
(45) Date of Patent: Mar. 29, 2022

(54) METHOD, SYSTEM, AND COMPUTER PROGRAM PRODUCT FOR MAINTAINING DATA CENTERS

(71) Applicant: Visa International Service Association, San Francisco, CA (US)

(72) Inventors: Shivam Mohan, Bengaluru (IN); Sudharshan Krishnakumar Gaddam, Bengaluru (IN); Rajat Raj, Bengaluru (IN)

(73) Assignee: Visa International Service Association, San Francisco, CA (US)

( * ) Notice: Subject to any disclaimer, the term of this patent is extended or adjusted under 35 U.S.C. 154(b) by 69 days.

(21) Appl. No.: 16/691,748

(22) Filed: Nov. 22, 2019

(65) Prior Publication Data

US 2021/0157689 A1 May 27, 2021

(51) Int. Cl.
| | |
|---|---|
| *H04L 12/00* | (2006.01) |
| *G06F 11/16* | (2006.01) |
| *H04L 67/1042* | (2022.01) |
| *G06F 16/182* | (2019.01) |
| *H04L 67/566* | (2022.01) |
| *H04L 67/1087* | (2022.01) |

(52) U.S. Cl.
CPC ........ *G06F 11/1687* (2013.01); *G06F 16/182* (2019.01); *H04L 67/1051* (2013.01); *H04L 67/1089* (2013.01); *H04L 67/2833* (2013.01)

(58) Field of Classification Search
CPC .. G06F 16/951; G06F 9/4451; G06F 11/1433; G06F 11/2089; G06F 16/172; G06F 9/5083; G06F 17/40; G06F 3/0635; G06F 11/2097; G16H 10/60; H04M 3/5183; H04L 67/1095; H04L 12/4679; H04L 49/201; H04L 12/66; H04L 43/10; H04L 65/60; G06Q 10/06
USPC ................................ 709/203, 205, 218, 223
See application file for complete search history.

(56) References Cited

U.S. PATENT DOCUMENTS

| | | | |
|---|---|---|---|
| 7,085,809 B2* | 8/2006 | Mori .................. | H04L 67/1095 709/203 |
| 8,243,589 B1* | 8/2012 | Trost .................. | H04L 67/1034 370/220 |
| 8,725,836 B2* | 5/2014 | Lowery ................ | G06F 16/958 709/217 |

(Continued)

OTHER PUBLICATIONS

Junqueira et al., "Zab: High-Performance Broadcast for Primary-Backup Systems", 2011 IEEE/IFIP 41st International Conference on Dependable Systems & Networks (DSN), 2011, pp. 245-256.

(Continued)

*Primary Examiner* — Frantz Coby
(74) *Attorney, Agent, or Firm* — The Webb Law Firm

(57) ABSTRACT

A method, system, and computer program product for maintaining data centers obtain input data; communicate an update request associated with the input data to a node of a plurality of nodes; receive an indication that the update request failed; communicate a result request for result data associated with processing of the input data to the node of the plurality of nodes until the result data associated with processing of the input data is received; and in response to receiving the result data associated with processing of the input data from the node, process the result data.

12 Claims, 4 Drawing Sheets

(56) References Cited

U.S. PATENT DOCUMENTS

| | | | |
|---|---|---|---|
| 8,959,185 B2* | 2/2015 | Nakil | H04L 41/0659 |
| | | | 709/219 |
| 9,104,917 B2* | 8/2015 | Kumar | G06K 9/00771 |
| 9,185,166 B2* | 11/2015 | DeCusatis | H04L 45/021 |
| 9,442,804 B2* | 9/2016 | Garza | G06F 11/2097 |
| 9,547,706 B2* | 1/2017 | Cowling | G06F 16/182 |
| 9,613,048 B2* | 4/2017 | Lin | G06F 16/172 |
| 9,628,409 B1* | 4/2017 | Yuvaraj | H04L 49/201 |
| 9,805,056 B2* | 10/2017 | Parkison | G06F 11/2089 |
| 9,813,301 B2* | 11/2017 | Xu | H04L 41/12 |
| 9,955,444 B1* | 4/2018 | Blum | H04L 65/60 |
| 9,983,993 B2* | 5/2018 | Flynn | G06F 3/0635 |
| 2006/0036761 A1* | 2/2006 | Amra | H04L 67/1095 |
| | | | 709/238 |
| 2007/0274505 A1* | 11/2007 | Gupta | H04M 3/5183 |
| | | | 379/265.01 |
| 2010/0111105 A1* | 5/2010 | Hamilton | H04L 67/322 |
| | | | 370/469 |
| 2013/0024559 A1* | 1/2013 | Susanta | G06F 9/5083 |
| | | | 709/224 |
| 2013/0030859 A1* | 1/2013 | Jung | G06Q 10/06 |
| | | | 705/7.26 |
| 2013/0055091 A1* | 2/2013 | Dutta | G06F 3/04842 |
| | | | 715/736 |
| 2013/0201986 A1* | 8/2013 | Sajassi | H04L 12/4679 |
| | | | 370/390 |
| 2014/0258227 A1* | 9/2014 | Muguda | G06F 17/40 |
| | | | 707/624 |
| 2015/0302147 A1* | 10/2015 | Whitsitt | G16H 10/60 |
| | | | 705/3 |
| 2016/0110182 A1* | 4/2016 | Barillari | G06F 11/1433 |
| | | | 717/171 |
| 2017/0264587 A1* | 9/2017 | Ju | H04L 12/66 |
| 2017/0279886 A1* | 9/2017 | Kim | G06F 9/4451 |
| 2018/0095845 A1* | 4/2018 | Sanakkayala | H04L 43/10 |
| 2018/0329969 A1* | 11/2018 | Abrams | G06F 16/951 |

OTHER PUBLICATIONS

Nacera et al., "A New Two Level Hierarchy Structuring for Node Partitioning in Ad Hoc Networks", Proceedings of the ACM Symposium on Applied Computing, 2010, pp. 719-726.

* cited by examiner

METHOD, SYSTEM, AND COMPUTER PROGRAM PRODUCT FOR MAINTAINING DATA CENTERS

BACKGROUND

1. Field

This disclosure relates generally to systems, devices, products, apparatus, and methods for maintaining data centers, and in some embodiments or aspects, to a method, a system, and a product for maintaining active-active semantics and data synchronization across data centers.

2. Technical Considerations

A common problem that many applications in distributed computing environments face is achieving active-active processing semantics across data centers while also maintaining synchronization of data across the data centers. In some existing systems, this problem may be addressed by allowing only a primary leader process to interact with a client and serve read/write operations. Further, these existing systems may require follower processes to implement updates from the primary process. Accordingly, there is a need in the art for improved maintenance of data centers.

SUMMARY

Accordingly, provided are improved systems, devices, products, apparatus, and/or methods for maintaining data centers.

For example, non-limiting embodiments or aspects may maintain active-active semantics across data centers and synchronization of data across the data centers while operating under various constraints and/or assumptions, such as, (i) that a source system (of input data) operates under the guarantee of providing exactly the same amount of data across all data sinks (data centers) given time t (e.g., the system is time bound), (ii) that a transform function is exactly the same across all clients (e.g., given a same set of inputs, the transform function generates a same output irrespective of the executing client), (iii) that the contents of an atomic update do not vary based on the client it is sent to (e.g., a data sink produces exactly the same update across all clients), and/or the like. As an example, if an execution criteria is met at a client (e.g., input data, such as transaction data associated with a transaction, is received, etc.), the client may attempt to communicate an update result to an ensemble of nodes so that the nodes in the ensemble may also be updated with respect to the input data. If the update request is successful, the client may trigger processing of the input data to generate output data. However, if the update request fails, the client may communicate another request that attempts to fetch the latest update for a given output id (OID) (e.g., for a current output, etc.). If the fetch request is successful, the client may trigger processing with the result of the fetch request. However, if the request fails, the client may retry the fetch request and keep on retrying the fetch request until the client gets through to fetch the result for the latest update for the given OID. Leaders of each ensemble of nodes may interact with each other to elect a leader of leaders, and each of the clients may interact with the leaders ensemble and, if an entire ensemble service crashes (e.g., in an event of a disaster, such as a data center failure, and/or the like), the clients may still continue data processing, because of the high availability introduced in the system due to the process of electing leaders among the ensembles.

According to some non-limiting embodiments or aspects, provided is a computer-implemented method including: obtaining, with at least one processor, input data; communicating, with at least one processor, an update request associated with the input data to a node of a plurality of nodes; receiving, with at least one processor, an indication that the update request failed; communicating, with at least one processor, a result request for result data associated with processing of the input data to the node of the plurality of nodes until the result data associated with processing of the input data is received; and in response to receiving the result data associated with processing of the input data from the node, processing, with at least one processor, the result data.

In some non-limiting embodiments or aspects, the input data is received via a client of a plurality of clients, and each client of the plurality of clients is simultaneously executing a same service.

In some non-limiting embodiments or aspects, the update request associated with the input data is communicated to the node via another node of the plurality of nodes different than the node.

In some non-limiting embodiments or aspects, the update request includes a request to perform a data entry associated with processing of the input data at a data center including the node.

In some non-limiting embodiments or aspects, the plurality of nodes is divided across a plurality of data centers such that each data center of the plurality of data centers includes a subset of nodes of the plurality of nodes, each subset of nodes includes a leader node elected by that subset of nodes, the leader nodes include a super leader node elected by the leader nodes, and the node includes the leader node of one subset of nodes.

In some non-limiting embodiments or aspects, the node includes the super leader node.

In some non-limiting embodiments or aspects, the method further includes: obtaining, with at least one processor, further input data; communicating, with at least one processor, a further update request associated with the further input data to the node of the plurality of nodes; receiving, with at least one processor, a further indication that the further update request is successful; and in response to receiving the further indication that the further update request is successful, processing, with at least one processor, the further input data.

In some non-limiting embodiments or aspects, the input data includes transaction data associated with at least one transaction, and the at least one transaction was previously processed.

According to some non-limiting embodiments or aspects, provided is a system including: one or more processors programmed and/or configured to: obtain input data; communicate an update request associated with the input data to a node of a plurality of nodes; receive an indication that the update request failed; communicate a result request for result data associated with processing of the input data to the node of the plurality of nodes until the result data associated with processing of the input data is received; and in response to receiving the result data associated with processing of the input data from the node, process the result data.

In some non-limiting embodiments or aspects, the input data is received via a client of a plurality of clients, and each client of the plurality of clients is simultaneously executing a same service.

In some non-limiting embodiments or aspects, the update request associated with the input data is communicated to the node via another node of the plurality of nodes different than the node.

In some non-limiting embodiments or aspects, the update request includes a request to perform a data entry associated with processing of the input data at a data center including the node.

In some non-limiting embodiments or aspects, the plurality of nodes is divided across a plurality of data centers such that each data center of the plurality of data centers includes a subset of nodes of the plurality of nodes, each subset of nodes includes a leader node elected by that subset of nodes, the leader nodes include a super leader node elected by the leader nodes, and the node includes the leader node of one subset of nodes.

In some non-limiting embodiments or aspects, the node includes the super leader node.

In some non-limiting embodiments or aspects, the one or more processors are further programmed and/or configured to: obtain further input data; communicate a further update request associated with the further input data to the node of the plurality of nodes; receive a further indication that the further update request is successful; and in response to receiving the further indication that the further update request is successful, process the further input data.

In some non-limiting embodiments or aspects, the input data includes transaction data associated with at least one transaction, and the at least one transaction was previously processed.

According to some non-limiting embodiments or aspects, provided is a computer program product including at least one non-transitory computer-readable medium including program instructions that, when executed by at least one processor, cause the at least one processor to: obtain input data; communicate an update request associated with the input data to a node of a plurality of nodes; receive an indication that the update request failed; communicate a result request for result data associated with processing of the input data to the node of the plurality of nodes until the result data associated with processing of the input data is received; and in response to receiving the result data associated with processing of the input data from the node, process the result data.

In some non-limiting embodiments or aspects, the input data is received via a client of a plurality of clients, and each client of the plurality of clients is simultaneously executing a same service.

In some non-limiting embodiments or aspects, the update request associated with the input data is communicated to the node via another node of the plurality of nodes different than the node.

In some non-limiting embodiments or aspects, the update request includes a request to perform a data entry associated with processing of the input data at a data center including the node.

Further embodiments or aspects are set forth in the following numbered clauses:

Clause 1. A computer-implemented method comprising: obtaining, with at least one processor, input data; communicating, with at least one processor, an update request associated with the input data to a node of a plurality of nodes; receiving, with at least one processor, an indication that the update request failed; communicating, with at least one processor, a result request for result data associated with processing of the input data to the node of the plurality of nodes until the result data associated with processing of the input data is received; and in response to receiving the result data associated with processing of the input data from the node, processing, with at least one processor, the result data.

Clause 2. The computer-implemented method of clause 1, wherein the input data is received via a client of a plurality of clients, and wherein each client of the plurality of clients is simultaneously executing a same service.

Clause 3. The computer-implemented method of clauses 1 or 2, wherein the update request associated with the input data is communicated to the node via another node of the plurality of nodes different than the node.

Clause 4. The computer-implemented method of any of clauses 1-3, wherein the update request includes a request to perform a data entry associated with processing of the input data at a data center including the node.

Clause 5. The computer-implemented method of any of clauses 1-4, wherein the plurality of nodes is divided across a plurality of data centers such that each data center of the plurality of data centers includes a subset of nodes of the plurality of nodes, wherein each subset of nodes includes a leader node elected by that subset of nodes, wherein the leader nodes include a super leader node elected by the leader nodes, and wherein the node includes the leader node of one subset of nodes.

Clause 6. The computer-implemented method of any of clauses 1-5, wherein the node includes the super leader node.

Clause 7. The computer-implemented method of any of clauses 1-6, further comprising: obtaining, with at least one processor, further input data; communicating, with at least one processor, a further update request associated with the further input data to the node of the plurality of nodes; receiving, with at least one processor, a further indication that the further update request is successful; and in response to receiving the further indication that the further update request is successful, processing, with at least one processor, the further input data.

Clause 8. The computer-implemented method of any of clauses 1-7, wherein the input data includes transaction data associated with at least one transaction, and wherein the at least one transaction was previously processed.

Clause 9. A system, comprising: one or more processors programmed and/or configured to: obtain input data; communicate an update request associated with the input data to a node of a plurality of nodes; receive an indication that the update request failed; communicate a result request for result data associated with processing of the input data to the node of the plurality of nodes until the result data associated with processing of the input data is received; and in response to receiving the result data associated with processing of the input data from the node, process the result data.

Clause 10. The system of clause 9, wherein the input data is received via a client of a plurality of clients, and wherein each client of the plurality of clients is simultaneously executing a same service.

Clause 11. The system of clauses 9 or 10, wherein the update request associated with the input data is communicated to the node via another node of the plurality of nodes different than the node.

Clause 12. The system of any of clauses 9-11, wherein the update request includes a request to perform a data entry associated with processing of the input data at a data center including the node.

Clause 13. The system of any of clauses 9-12, wherein the plurality of nodes is divided across a plurality of data centers such that each data center of the plurality of data centers includes a subset of nodes of the plurality of nodes, wherein each subset of nodes includes a leader node elected by that subset of nodes, wherein the leader nodes include a super leader node elected by the leader nodes, and wherein the node includes the leader node of one subset of nodes.

Clause 14. The system of any of clauses 9-13, wherein the node includes the super leader node.

Clause 15. The system of any of clauses 9-14, wherein the one or more processors are further programmed and/or configured to: obtain further input data; communicate a further update request associated with the further input data to the node of the plurality of nodes; receive a further indication that the further update request is successful; and in response to receiving the further indication that the further update request is successful, process the further input data.

Clause 16. The system of any of clauses 9-15, wherein the input data includes transaction data associated with at least one transaction, and wherein the at least one transaction was previously processed.

Clause 17. A computer program product comprising at least one non-transitory computer-readable medium including program instructions that, when executed by at least one processor, cause the at least one processor to: obtain input data; communicate an update request associated with the input data to a node of a plurality of nodes; receive an indication that the update request failed; communicate a result request for result data associated with processing of the input data to the node of the plurality of nodes until the result data associated with processing of the input data is received; and in response to receiving the result data associated with processing of the input data from the node, process the result data.

Clause 18. The computer program product of clause 17, wherein the input data is received via a client of a plurality of clients, and wherein each client of the plurality of clients is simultaneously executing a same service.

Clause 19. The computer program product of clauses 17 or 18, wherein the update request associated with the input data is communicated to the node via another node of the plurality of nodes different than the node.

Clause 20. The computer program product of any of clauses 17-19, wherein the update request includes a request to perform a data entry associated with processing of the input data at a data center including the node.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of limits. As used in the specification and the claims, the singular form of "a," "an," and "the" include plural referents unless the context clearly dictates otherwise.

BRIEF DESCRIPTION OF THE DRAWINGS

Additional advantages and details are explained in greater detail below with reference to the exemplary embodiments or aspects that are illustrated in the accompanying schematic figures, in which.

DESCRIPTION

Figure 1A:
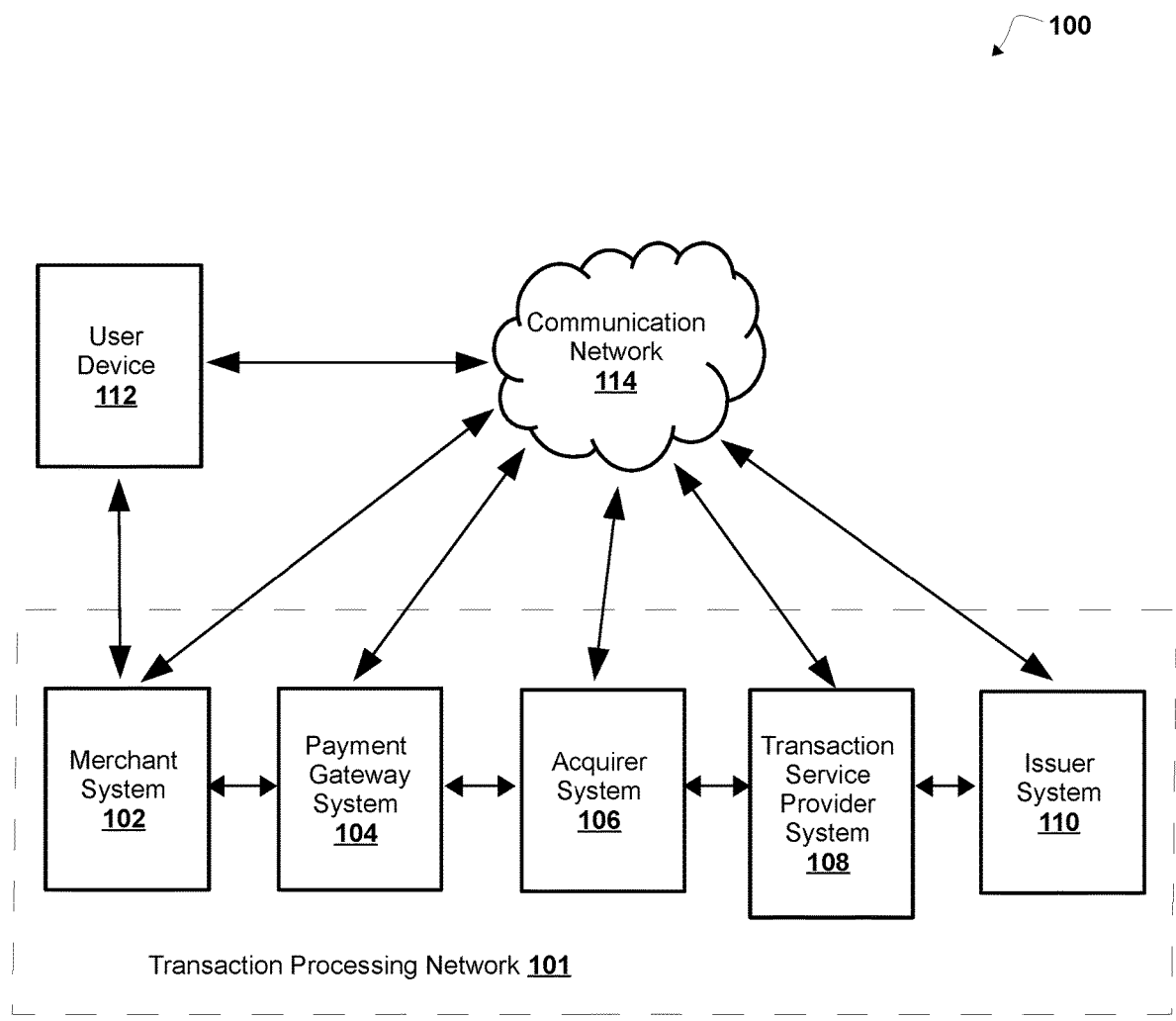
FIG. 1A is a diagram of non-limiting embodiments or aspects of an environment in which systems, devices, products, apparatus, and/or methods, described herein, may be implemented.

It is to be understood that the present disclosure may assume various alternative variations and step sequences, except where expressly specified to the contrary. It is also to be understood that the specific devices and processes illustrated in the attached drawings, and described in the following specification, are simply exemplary and non-limiting embodiments or aspects. Hence, specific dimensions and other physical characteristics related to the embodiments or aspects disclosed herein are not to be considered as limiting.

No aspect, component, element, structure, act, step, function, instruction, and/or the like used herein should be construed as critical or essential unless explicitly described as such. Also, as used herein, the articles "a" and "an" are intended to include one or more items, and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the terms "communication" and "communicate" refer to the receipt or transfer of one or more signals, messages, commands, or other type of data. For one unit (e.g., any device, system, or component thereof) to be in communication with another unit means that the one unit is able to directly or indirectly receive data from and/or transmit data to the other unit. This may refer to a direct or indirect connection that is wired and/or wireless in nature. Additionally, two units may be in communication with each other even though the data transmitted may be modified, processed, relayed, and/or routed between the first and second unit. For example, a first unit may be in communication with a second unit even though the first unit passively receives data and does not actively transmit data to the second unit. As another example, a first unit may be in communication with a second unit if an intermediary unit processes data from one unit and transmits processed data to the second unit. It will be appreciated that numerous other arrangements are possible.

It will be apparent that systems and/or methods, described herein, can be implemented in different forms of hardware, software, or a combination of hardware and software. The actual specialized control hardware or software code used to implement these systems and/or methods is not limiting of the implementations. Thus, the operation and behavior of the systems and/or methods are described herein without reference to specific software code, it being understood that software and hardware can be designed to implement the systems and/or methods based on the description herein.

Some non-limiting embodiments or aspects are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

As used herein, the term "transaction service provider" may refer to an entity that receives transaction authorization requests from merchants or other entities and provides guarantees of payment, in some cases through an agreement between the transaction service provider and an issuer institution. The terms "transaction service provider" and "transaction service provider system" may also refer to one or more computer systems operated by or on behalf of a transaction service provider, such as a transaction processing system executing one or more software applications. A transaction processing system may include one or more server computers with one or more processors and, in some non-limiting embodiments or aspects, may be operated by or on behalf of a transaction service provider.

As used herein, the term "account identifier" may include one or more Primary Account Numbers (PAN), tokens, or other identifiers (e.g., a globally unique identifier (GUID), a universally unique identifier (UUID), etc.) associated with a customer account of a user (e.g., a customer, a consumer, and/or the like). The term "token" may refer to an identifier that is used as a substitute or replacement identifier for an original account identifier, such as a PAN. Account identifiers may be alphanumeric or any combination of characters and/or symbols. Tokens may be associated with a PAN or other original account identifier in one or more databases such that they can be used to conduct a transaction without directly using the original account identifier. In some examples, an original account identifier, such as a PAN, may be associated with a plurality of tokens for different individuals or purposes.

As used herein, the terms "issuer institution," "portable financial device issuer," "issuer," or "issuer bank" may refer to one or more entities that provide one or more accounts to a user (e.g., a customer, a consumer, an entity, an organization, and/or the like) for conducting transactions (e.g., payment transactions), such as initiating credit card payment transactions and/or debit card payment transactions. For example, an issuer institution may provide an account identifier, such as a personal account number (PAN), to a user that uniquely identifies one or more accounts associated with that user. The account identifier may be embodied on a portable financial device, such as a physical financial instrument (e.g., a payment card), and/or may be electronic and used for electronic payments. In some non-limiting embodiments or aspects, an issuer institution may be associated with a bank identification number (BIN) that uniquely identifies the issuer institution. As used herein "issuer institution system" may refer to one or more computer systems operated by or on behalf of an issuer institution, such as a server computer executing one or more software applications. For example, an issuer institution system may include one or more authorization servers for authorizing a payment transaction.

As used herein, the term "merchant" may refer to an individual or entity that provides products and/or services, or access to products and/or services, to customers based on a transaction, such as a payment transaction. The term "merchant" or "merchant system" may also refer to one or more computer systems operated by or on behalf of a merchant, such as a server computer executing one or more software applications. A "point-of-sale (POS) system," as used herein, may refer to one or more computers and/or peripheral devices used by a merchant to engage in payment transactions with customers, including one or more card readers, near-field communication (NFC) receivers, radio frequency identification (RFID) receivers, and/or other contactless transceivers or receivers, contact-based receivers, payment terminals, computers, servers, input devices, and/or other like devices that can be used to initiate a payment transaction.

As used herein, the term "mobile device" may refer to one or more portable electronic devices configured to communicate with one or more networks. As an example, a mobile device may include a cellular phone (e.g., a smartphone or standard cellular phone), a portable computer (e.g., a tablet computer, a laptop computer, etc.), a wearable device (e.g., a watch, pair of glasses, lens, clothing, and/or the like), a personal digital assistant (PDA), and/or other like devices. The terms "client device" and "user device," as used herein, refer to any electronic device that is configured to communicate with one or more servers or remote devices and/or systems. A client device or user device may include a mobile device, a network-enabled appliance (e.g., a network-enabled television, refrigerator, thermostat, and/or the like), a computer, a POS system, and/or any other device or system capable of communicating with a network.

As used herein, the term "computing device" or "computer device" may refer to one or more electronic devices that are configured to directly or indirectly communicate with or over one or more networks. The computing device may be a mobile device, a desktop computer, or the like. Furthermore, the term "computer" may refer to any computing device that includes the necessary components to receive, process, and output data, and normally includes a display, a processor, a memory, an input device, and a network interface. An "application" or "application program interface" (API) refers to computer code or other data sorted on a computer-readable medium that may be executed by a processor to facilitate the interaction between software components, such as a client-side front-end and/or server-side back-end for receiving data from the client. An "interface" refers to a generated display, such as one or more graphical user interfaces (GUIs) with which a user may interact, either directly or indirectly (e.g., through a keyboard, mouse, touchscreen, etc.).

As used herein, the terms "electronic wallet" and "electronic wallet application" refer to one or more electronic devices and/or software applications configured to initiate and/or conduct payment transactions. For example, an electronic wallet may include a mobile device executing an electronic wallet application, and may further include server-side software and/or databases for maintaining and providing transaction data to the mobile device. An "electronic wallet provider" may include an entity that provides and/or maintains an electronic wallet for a customer, such as Google Wallet™, Android Pay®, Apple Pay®, Samsung Pay®, and/or other like electronic payment systems. In some non-limiting examples, an issuer bank may be an electronic wallet provider.

As used herein, the term "portable financial device" or "payment device" may refer to a payment card (e.g., a credit or debit card), a gift card, a smartcard, smart media, a payroll card, a healthcare card, a wrist band, a machine-readable medium containing account information, a keychain device or fob, an RFID transponder, a retailer discount or loyalty card, a mobile device executing an electronic wallet application, a personal digital assistant (PDA), a security card, an access card, a wireless terminal, and/or a transponder, as examples. The portable financial device may include a volatile or a non-volatile memory to store information, such as an account identifier and/or a name of the account holder.

As used herein, the term "server" may refer to or include one or more processors or computers, storage devices, or similar computer arrangements that are operated by or facilitate communication and processing for multiple parties in a network environment, such as the Internet, although it will be appreciated that communication may be facilitated over one or more public or private network environments and that various other arrangements are possible. Further, multiple computers, e.g., servers, or other computerized devices, such as POS devices, directly or indirectly communicating in the network environment may constitute a "system," such as a merchant's POS system.

As used herein, the term "acquirer" may refer to an entity licensed by the transaction service provider and/or approved by the transaction service provider to originate transactions using a portable financial device of the transaction service provider. Acquirer may also refer to one or more computer systems operated by or on behalf of an acquirer, such as a server computer executing one or more software applications (e.g., "acquirer server"). An "acquirer" may be a merchant bank, or in some cases, the merchant system may be the acquirer. The transactions may include original credit transactions (OCTs) and account funding transactions (AFTs). The acquirer may be authorized by the transaction service provider to sign merchants of service providers to originate transactions using a portable financial device of the transaction service provider. The acquirer may contract with payment facilitators to enable the facilitators to sponsor merchants. The acquirer may monitor compliance of the payment facilitators in accordance with regulations of the transaction service provider. The acquirer may conduct due diligence of payment facilitators and ensure that proper due diligence occurs before signing a sponsored merchant. Acquirers may be liable for all transaction service provider programs that they operate or sponsor. Acquirers may be responsible for the acts of its payment facilitators and the merchants it or its payment facilitators sponsor.

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of portable financial devices managed by a transaction service provider. As used herein, the term "payment gateway system" may refer to one or more computer systems, computer devices, servers, groups of servers, and/or the like, operated by or on behalf of a payment gateway.

As used herein, the term "data center" or "data sink" may refer to or include one or more different forms of hardware, software, or a combination of hardware and software, such as a computer, server, and/or the like, capable of receiving data, such as capable of receiving input data from clients and performing updates or data entries (e.g., read/write operations, etc.) to maintain a state of the system and facilitate the sharing of that state with clients. A data center may include one or more nodes (e.g., one or more ensembles of nodes, etc.) that interact with other nodes (e.g., at the same data center, at another data center, etc.) to maintain state of the system and facilitate the sharing of that state with clients. For example, as used herein, the term "ensemble" or "subset of nodes" may refer to a group of nodes that interact with each other to maintain state of the system and facilitate the sharing of that state with clients.

As used herein, the term "client" may refer to or include a process/system with whom a responsibility to execute an application process/service (e.g., a fraud detection process, a stand-in processing process, etc.) lies with. For example, a client may communicate with a data center for processing of input data (e.g., transaction data, etc.) and updating the state of the system based on the processing of the input data.

As used herein, the term "synchronized inputs" may refer to an input feed for which exactly the same data is provisioned to each data center or data sink without respect to order. For example, an input feed may be referred to as "synchronized", if the source provisioning the data provides a guarantee of provisioning exactly the same data to all of the data sink systems. As an example, the order in which the data is provisioned may not be considered, but the data provisioned is exactly the same.

As used herein, the term "synchronized outputs" may refer to a set of output that is the same across each participating system. For example, an output set may be referred to as "synchronized", if the set of output across all the participating system is exactly the same. As an example, the order of elements in the output set may not be considered, but the elements of the sets follow the law of set equality, which states for any sets A and B, A=B if and only if $\forall x(x \in A \leftrightarrow x \in B)$.

As used herein, the term "execution criteria" may refer to a set of conditions, which when met, triggers processing of data. For example, the execution of input data or files may begin if and only if the execution criteria is satisfied in full.

As used herein, the term "transform function" may refer to logic or a function (e.g., $y=f(x1, x2, x3 \ldots)$, etc.) that is executed by receiving input files as parameters and generating an output. A transform function may be expected to be idempotent, but it is not a necessary condition, and in a case where the transform function is not idempotent, a responsibility of (re)-creating state of an application may lie with the clients. In some non-limiting embodiments or aspects, a transform function may include a fraud detection function for detecting a fraudulent transaction, a stand-in processing function, and/or the like.

Provided are improved systems, devices, products, apparatus, and/or methods for maintaining data centers.

Non-limiting embodiments or aspects of the present disclosure are directed to systems, methods, and computer program products for maintaining data centers that obtain input data; communicate an update request associated with the input data to a node of a plurality of nodes; receive an indication that the update request failed; communicate a result request for result data associated with processing of the input data to the node of the plurality of nodes until the result data associated with processing of the input data is received; and in response to receiving the result data associated with processing of the input data from the node, process the result data. In this way, non-limiting embodiments or aspects of the present disclosure may provide for an updating node securing approval from target nodes before implementing an update and/or any of the nodes in an ensemble to interact with a client and/or serve data entry operations (e.g., read/write operations, etc.), which enables applications/clients operating across multiple data centers to be coordinated, even in the case of a catastrophic event, such as a data center crash.

Referring now to FIG. 1A, FIG. 1A is a diagram of an example environment 100 in which devices, systems, methods, and/or products described herein, may be implemented. As shown in FIG. 1A, environment 100 includes transaction processing network 101, which may include merchant system 102, payment gateway system 104, acquirer system 106, transaction service provider system 108, and/or issuer system 110, user device 112, and/or communication network 114. Transaction processing network 101, merchant system 102, payment gateway system 104, acquirer system 106, transaction service provider system 108, issuer system 110, and/or user device 112 may interconnect (e.g., establish a connection to communicate, etc.) via wired connections, wireless connections, or a combination of wired and wireless connections.

Merchant system 102 may include one or more devices capable of receiving information and/or data from payment gateway system 104, acquirer system 106, transaction service provider system 108, issuer system 110, and/or user device 112 (e.g., via communication network 114, etc.) and/or communicating information and/or data to payment gateway system 104, acquirer system 106, transaction service provider system 108, issuer system 110, and/or user device 112 (e.g., via communication network 114, etc.). Merchant system 102 may include a device capable of receiving information and/or data from user device 112 via a communication connection (e.g., an NFC communication connection, an RFID communication connection, a Bluetooth® communication connection, etc.) with user device 112, and/or communicating information and/or data to user device 112 via the communication connection. For example, merchant system 102 may include a computing device, such as a server, a group of servers, a client device, a group of client devices, and/or other like devices. In some non-limiting embodiments or aspects, merchant system 102 may be associated with a merchant as described herein. In some non-limiting embodiments or aspects, merchant system 102 may include one or more devices, such as computers, computer systems, and/or peripheral devices capable of being used by a merchant to conduct a payment transaction with a user. For example, merchant system 102 may include a POS device and/or a POS system.

Payment gateway system 104 may include one or more devices capable of receiving information and/or data from merchant system 102, acquirer system 106, transaction service provider system 108, issuer system 110, and/or user device 112 (e.g., via communication network 114, etc.) and/or communicating information and/or data to merchant system 102, acquirer system 106, transaction service provider system 108, issuer system 110, and/or user device 112 (e.g., via communication network 114, etc.). For example, payment gateway system 104 may include a computing device, such as a server, a group of servers, and/or other like devices. In some non-limiting embodiments or aspects, payment gateway system 104 is associated with a payment gateway as described herein.

Acquirer system 106 may include one or more devices capable of receiving information and/or data from merchant system 102, payment gateway system 104, transaction service provider system 108, issuer system 110, and/or user device 112 (e.g., via communication network 114, etc.) and/or communicating information and/or data to merchant system 102, payment gateway system 104, transaction service provider system 108, issuer system 110, and/or user device 112 (e.g., via communication network 114, etc.). For example, acquirer system 106 may include a computing device, such as a server, a group of servers, and/or other like devices. In some non-limiting embodiments or aspects, acquirer system 106 may be associated with an acquirer as described herein.

Transaction service provider system 108 may include one or more devices capable of receiving information and/or data from merchant system 102, payment gateway system 104, acquirer system 106, issuer system 110, and/or user device 112 (e.g., via communication network 114, etc.) and/or communicating information and/or data to merchant system 102, payment gateway system 104, acquirer system 106, issuer system 110, and/or user device 112 (e.g., via communication network 114, etc.). For example, transaction service provider system 108 may include a computing device, such as a server (e.g., a transaction processing server, etc.), a group of servers, and/or other like devices. In some non-limiting embodiments or aspects, transaction service provider system 108 may be associated with a transaction service provider as described herein. In some non-limiting embodiments or aspects, transaction service provider 108 may include and/or access one or more one or more internal and/or external databases including account data, transaction data, merchant data, demographic data, and/or the like.

Issuer system 110 may include one or more devices capable of receiving information and/or data from merchant system 102, payment gateway system 104, acquirer system 106, transaction service provider system 108, and/or user device 112 (e.g., via communication network 114, etc.) and/or communicating information and/or data to merchant system 102, payment gateway system 104, acquirer system 106, transaction service provider system 108, and/or user device 112 (e.g., via communication network 114, etc.). For example, issuer system 110 may include a computing device, such as a server, a group of servers, and/or other like devices. In some non-limiting embodiments or aspects, issuer system 110 may be associated with an issuer institution as described herein. For example, issuer system 110 may be associated with an issuer institution that issued a payment account or instrument (e.g., a credit account, a debit account, a credit card, a debit card, etc.) to a user (e.g., a user associated with user device 112, etc.).

In some non-limiting embodiments or aspects, transaction processing network 101 includes a plurality of systems in a communication path for processing a transaction. For example, transaction processing network 101 may include merchant system 102, payment gateway system 104, acquirer system 106, transaction service provider system 108, and/or issuer system 110 in a communication path (e.g., a communication path, a communication channel, a communication network, etc.) for processing an electronic payment transaction. As an example, transaction processing network 101 may process (e.g., initiate, conduct, authorize, etc.) an electronic payment transaction via the communication path between merchant system 102, payment gateway system 104, acquirer system 106, transaction service provider system 108, and/or issuer system 110.

User device 112 may include one or more devices capable of receiving information and/or data from merchant system 102, payment gateway system 104, acquirer system 106, transaction service provider system 108, and/or issuer system 110 (e.g., via communication network 114, etc.) and/or communicating information and/or data to merchant system 102, payment gateway system 104, acquirer system 106, transaction service provider system 108, and/or issuer system 110 (e.g., via communication network 114, etc.). For example, user device 112 may include a client device and/or the like. In some non-limiting embodiments or aspects, user device 112 may be capable of receiving information (e.g., from merchant system 102, etc.) via a short range wireless communication connection (e.g., an NFC communication connection, an RFID communication connection, a Bluetooth® communication connection, and/or the like), and/or communicating information (e.g., to merchant system 102, etc.) via a short range wireless communication connection. In some non-limiting embodiments or aspects, user device 112 may include an application associated with user device 112, such as an application stored on user device 112, a mobile application (e.g., a mobile device application, a native application for a mobile device, a mobile cloud application for a mobile device, an electronic wallet application, and/or the like) stored and/or executed on user device 112.

Communication network 114 may include one or more wired and/or wireless networks. For example, communication network 114 may include a cellular network (e.g., a long-term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN)), a private network, an ad hoc network, an intranet, the Internet, a fiber optic-based network, a cloud computing network, and/or the like, and/or a combination of these or other types of networks.

Figure 1B:
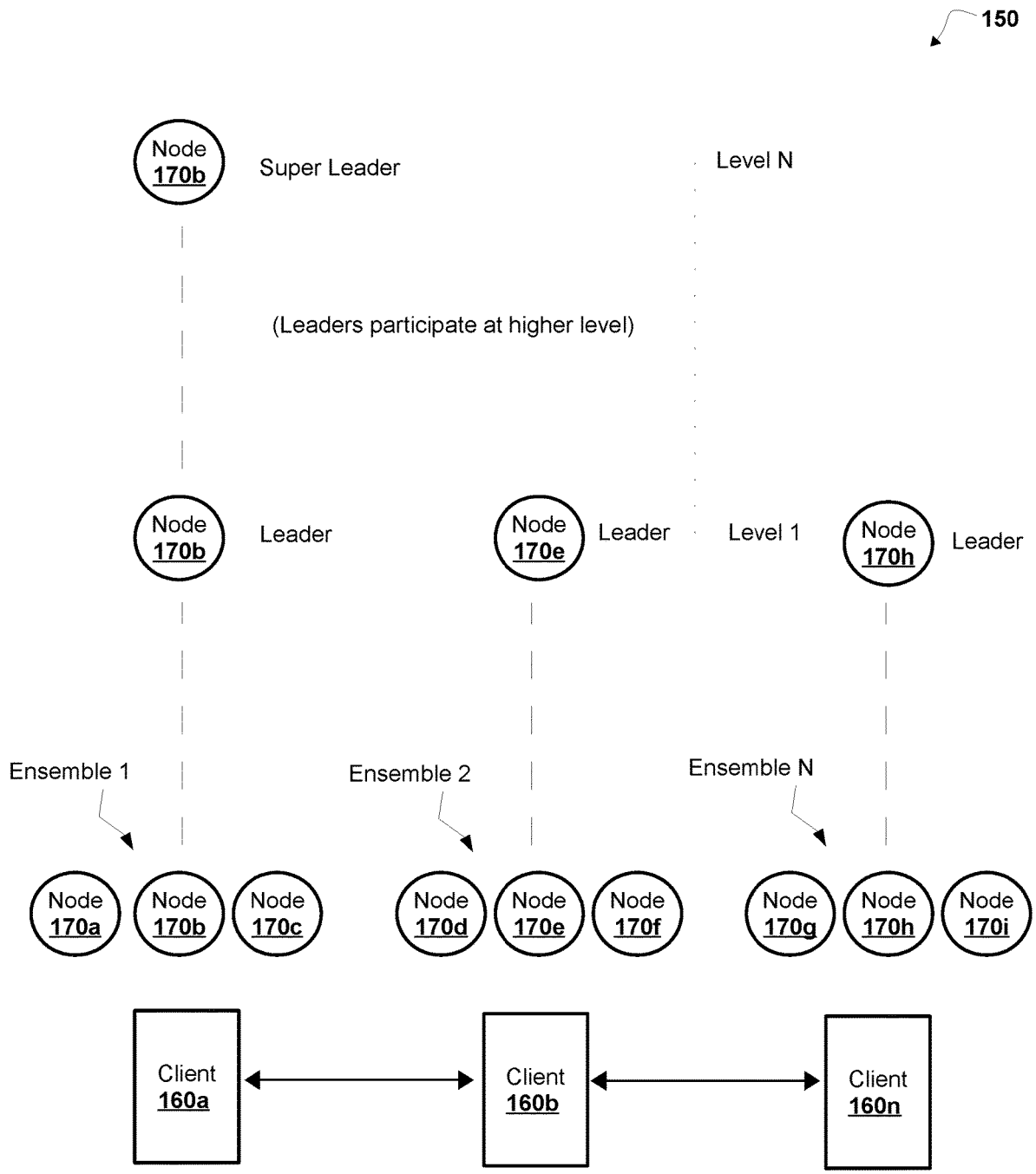
FIG. 1B is a diagram of non-limiting embodiments or aspects of a system for maintaining data centers.

Referring now to FIG. 1B, FIG. 1B is a diagram of non-limiting embodiments or aspects of a system for maintaining data centers. System 150 may correspond to one or more devices of transaction processing network 101, one or more devices of merchant system 102, one or more devices of payment gateway system 104, one or more devices of acquirer system 106, one or more devices of transaction service provider system 108, one or more devices of issuer system 110, user device 112 (e.g., one or more devices of a system of user device 112, etc.), and/or one or more devices of communication network 114. As shown in FIG. 1B, system 150 includes a plurality of clients 160a, 160b, . . . 160n and a plurality of nodes 170a . . . 170i. Clients 160a, 160b, . . . 160n and/or the plurality of nodes 170a . . . 170i may be implemented within a single device and/or system or be distributed across multiple devices and/or systems. For example, nodes 170a, 170b, and 170c may be included in a first ensemble of nodes (e.g., Ensemble 1) and/or be implemented by and/or at a first data center, nodes 170d, 170e, and 170f may be included in a second ensemble of nodes (e.g., Ensemble 2) and/or implemented by and/or at a second data center, nodes 170g, 170h, and 170i may be included in a third ensemble of nodes (e.g., Ensemble 3) and/or be implemented by and/or at a third data center. As an example, each data center of a plurality of data centers may include a subset of nodes (e.g., an ensemble) of the plurality of nodes, each subset of nodes may include a leader node elected by that subset of nodes, and the leader nodes (e.g., a leader ensemble) may include a super leader node elected by the leader nodes. In such an example, each ensemble participating in a synchronization process for maintaining data centers may select or elect a leader among themselves using known leader election techniques, each of the leaders from each of the ensembles may come together to create a leader ensemble, each of the leaders in the leader ensemble may again elect a leader, which may be referred to as a "super leader" or a "leader of leaders", and each of the clients may connect to the leader ensemble. For example, a leader of each of the ensembles (e.g., nodes 170b, 170e, and 170h as shown in FIG. 1B) may interact with each other to elect a leader of leaders or a super leader (e.g., node 170b as shown in FIG. 1b), and each of the clients 160a, 160b, . . . 160n may interact with the leaders ensemble, and in case of any disaster, such as if an entire ensemble service crashes, and/or the like, the clients 160a, 160b, . . . 160n can still continue data processing, because of the high availability introduced in the system.

Still referring to FIG. 1B, a failure of any node(s) of an ensemble located at any data center does not affect the synchronization and/or processing availability of the system 150. For example, if any one node of any ensemble crashes, there is no impact to the ensemble, which may continue processing until a majority of nodes of the ensemble are available. If a leader node of any ensemble crashes, the crash may trigger a leader election in that ensemble, which re-elects a leader, and there is no impact on the leader ensemble, which operates smoothly until a majority of nodes are working. If any super leader node crashes, the crash may trigger a leader election in the leader ensemble, as well as a leader election in the ensemble to which the crashed leader belonged. If a leader at level N crashes, the crash may trigger a leader election at all levels from N to 1. If an entire ensemble crashes, the system is still not affected. For example, all scenarios that may occur because of an ensemble failure are covered by the previously noted scenarios. System 150 may be configured to maintain data centers including the plurality of nodes 170a . . . 170i and is described in more detail herein below with respect to FIG. 3 which discloses a process therefor.

The number and arrangement of devices and systems shown in FIGS. 1A and 1B is provided as an example. There may be additional devices and/or systems, fewer devices and/or systems, different devices and/or systems, or differently arranged devices and/or systems than those shown in FIGS. 1A and 1B. Furthermore, two or more devices and/or systems shown in FIGS. 1A and 1B may be implemented within a single device and/or system, or a single device and/or system shown in FIGS. 1A and 1B may be implemented as multiple, distributed devices and/or systems. Additionally or alternatively, a set of devices and/or systems (e.g., one or more devices or systems) of environment 100 may perform one or more functions described as being performed by another set of devices or systems of environment 100.

Figure 2:
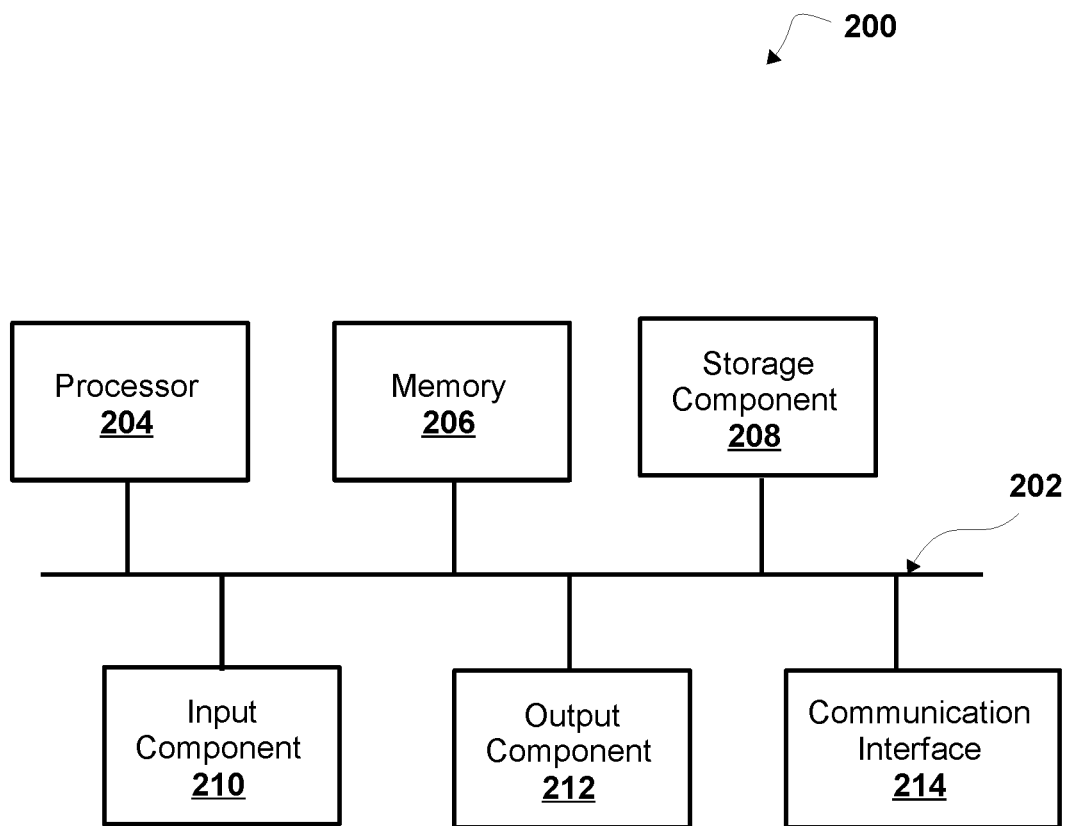
FIG. 2 is a diagram of non-limiting embodiments or aspects of components of one or more devices and/or one or more systems of FIGS. 1A and 1B.

Referring now to FIG. 2, FIG. 2 is a diagram of example components of a device 200. Device 200 may correspond to one or more devices of transaction processing network 101, one or more devices of merchant system 102, one or more devices of payment gateway system 104, one or more devices of acquirer system 106, one or more devices of transaction service provider system 108, one or more devices of issuer system 110, and/or user device 112 (e.g., one or more devices of a system of user device 112, etc.). In some non-limiting embodiments or aspects, one or more devices of transaction processing network 101, one or more devices of merchant system 102, one or more devices of payment gateway system 104, one or more devices of acquirer system 106, one or more devices of transaction service provider system 108, one or more devices of issuer system 110, user device 112 (e.g., one or more devices of a system of user device 112, etc.), and/or one or more devices of communication network 114 may include at least one device 200 and/or at least one component of device 200. As shown in FIG. 2, device 200 may include a bus 202, a processor 204, memory 206, a storage component 208, an input component 210, an output component 212, and a communication interface 214.

Bus 202 may include a component that permits communication among the components of device 200. In some non-limiting embodiments or aspects, processor 204 may be implemented in hardware, software, or a combination of hardware and software. For example, processor 204 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 206 may include random access memory (RAM), read-only memory (ROM), and/or another type of dynamic or static storage device (e.g., flash memory, magnetic memory, optical memory, etc.) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touch screen display, a keyboard, a keypad, a mouse, a button, a switch, a microphone, etc.). Additionally or alternatively, input component 210 may include a sensor for sensing information (e.g., a global positioning system (GPS) component, an accelerometer, a gyroscope, an actuator, etc.). Output component 212 may include a component that provides output information from device 200 (e.g., a display, a speaker, one or more light-emitting diodes (LEDs), etc.).

Communication interface 214 may include a transceiver-like component (e.g., a transceiver, a separate receiver and transmitter, etc.) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A non-transitory memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally or alternatively, hardwired circuitry may be used in place of or in combination with software instructions to perform one or more processes described herein. Thus, embodiments or aspects described herein are not limited to any specific combination of hardware circuitry and software.

Memory 206 and/or storage component 208 may include data storage or one or more data structures (e.g., a database, etc.). Device 200 may be capable of receiving information from, storing information in, communicating information to, or searching information stored in the data storage or one or more data structures in memory 206 and/or storage component 208. For example, transaction service provider system 108 may include and/or access one or more internal and/or external databases that store transaction data associated with transactions processed and/or being processed in transaction processing network 101 (e.g., prior or historical transactions processed via transaction service provider system 108, etc.), account data, request data, input data, result data, and/or the like.

The number and arrangement of components shown in FIG. 2 are provided as an example. In some non-limiting embodiments or aspects, device 200 may include additional components, fewer components, different components, or differently arranged components than those shown in FIG. 2. Additionally or alternatively, a set of components (e.g., one or more components) of device 200 may perform one or more functions described as being performed by another set of components of device 200.

Figure 3:
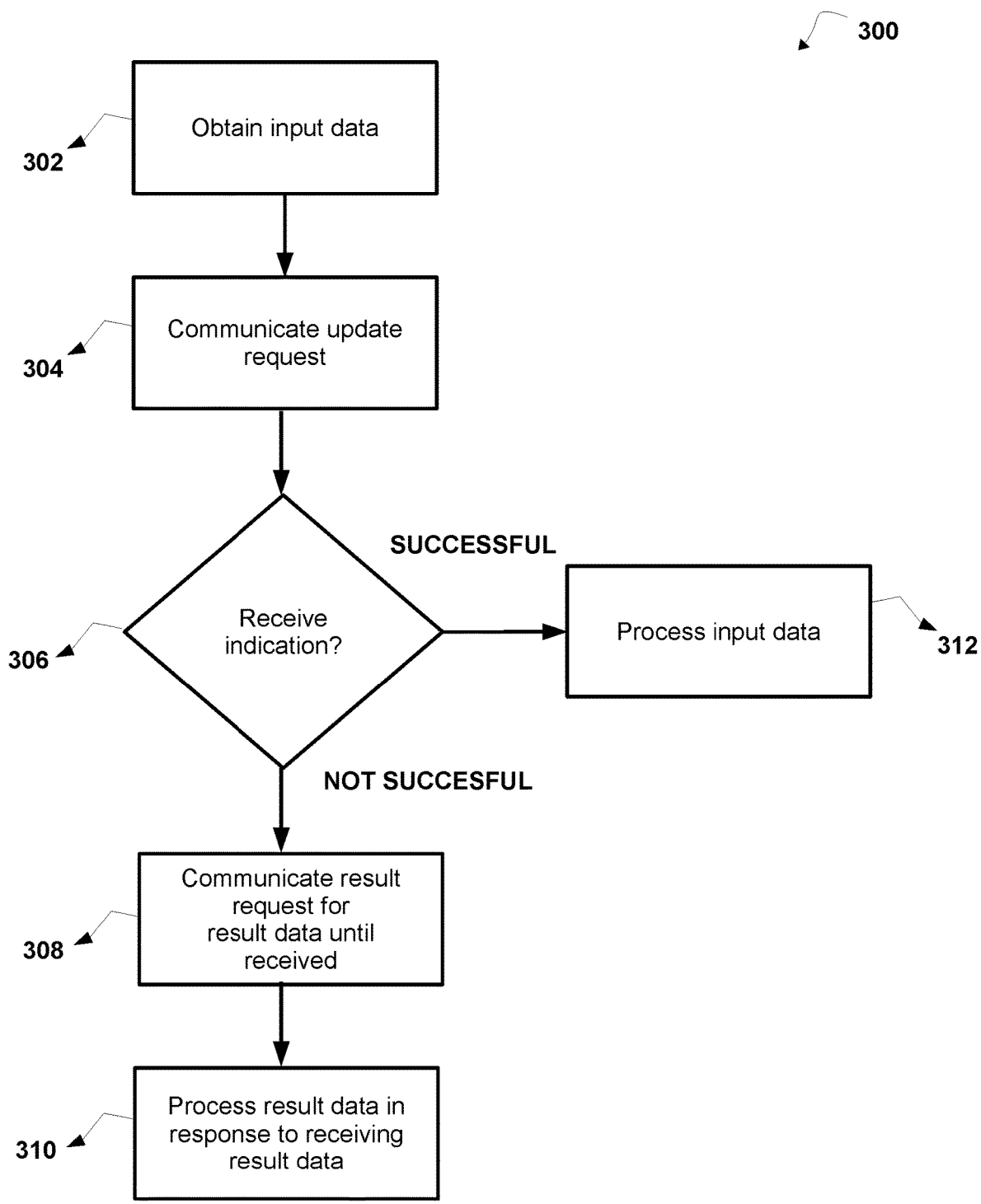
FIG. 3 is a flowchart of non-limiting embodiments or aspects of a process for maintaining data centers.

Referring now to FIG. 3, FIG. 3 is a flowchart of non-limiting embodiments or aspects of a process 300 for maintaining data centers. In some non-limiting embodiments or aspects, one or more of the steps of process 300 may be performed (e.g., completely, partially, etc.) by transaction service provider system 108 (e.g., one or more devices of transaction service provider system 108, a node 170 of a data center of transaction service provider system 108, a client 160, a client 160 communicating with a node 170 of a data center of transaction service provider system 108, etc.). In some non-limiting embodiments or aspects, one or more of the steps of process 300 may be performed (e.g., completely, partially, etc.) by another device or a group of devices separate from or including transaction service provider system 108, such as merchant system 102 (e.g., one or more devices of merchant system 102), payment gateway system 104 (e.g., one or more devices of payment gateway system 104), acquirer system 106 (e.g., one or more devices of acquirer system 106), issuer system 110 (e.g., one or more devices of issuer system 110), and/or user device 112 (e.g., one or more devices of a system of user device 112).

In some non-limiting embodiments or aspects, process 300 may operate under certain constraints, such as a source feed being time bound and synchronization (although not necessarily total ordering) among feeds provisioning data across data centers. For example, process 300 may operate under at least one of the following constraints: synchronized inputs, synchronized outputs, a time bound source system, a same transform function across each client, a same update across all clients, or any combination thereof.

In some non-limiting embodiments or aspects, a time bound source system for input data may operate under a guarantee of providing exactly the same amount of data across each data center or data sink within a given time t. For example, assuming an upper limit of time bound for the sink $t_{max}$ is $\infty$, if an event, $e_1$ is provisioned on a client $c_1$ at time $t_1$, if event $e_1$ met the execution criteria, $c_1$ will begin processing after informing the ensemble about the same. Given $t_{max}$ for a sink is ∞, it is possible that $e_1$ may never show up on other clients, because of which the system may never be able to achieve state of total synchronization. Hence, the constraint of a time bound source system may be imposed. As an example, for an Input Set IA: {I1, I2, I3 . . . Ik . . . In} input to a first client 160 for processing to provide an output set Output Set OA: {O1, O2, O3 . . . Ok . . . On} and an Input Set IB: {I1, I2, I3 . . . Ik . . . In} input to a second client to provide an output set Output Set OB: {O1, O2, O3 . . . Ok . . . On}, IA, IB∈Time bound, Synchronized Inputs, which may ensure synchronization between Output Set OA and OB using process 300.

Further, assuming that the transform function is exactly the same across each client may mean that given a same set of inputs, the transform function generates the same output irrespective of the executing client. Moreover, a sink may produce exactly the same updates across all clients, and the contents of an atomic update may not vary based on the client to which the update is being sent. The update can contain metadata to various peripheral functions, but the metadata may not become input to the transform function.

As shown in FIG. 3, at step 302, process 300 includes obtaining input data. For example, a client 160 may obtain input data. As an example, input data may be received via a client of a plurality of clients, and each client of the plurality of clients may be simultaneously executing a same service. In such an example, receipt of the input data may satisfy an execution criteria (e.g., suppose to generate output y1, inputs x1 and x2 are required and the execution criteria function is $f$, Then, $y1=f(x1, x2)$, etc.) for the client 160 to communicate with a node 170 of an ensemble (e.g., Ensemble 1, etc.) to request to perform an update (e.g., a read/write operation, etc.) in the ensemble associated with processing of the input data. In such an example, satisfaction of the update criteria may trigger the client to communicate an update request including a request to make a data entry (e.g., a read/write operation, etc.) associated with processing of the input data in a leader node of an ensemble (e.g., Ensemble 1, etc.) with which the client 160 is communicating.

In some non-limiting embodiments or aspects, input data may include transaction data. For example, input data may include transaction data associated with at least one transaction at merchant system 102. As an example, inputs x1, x2, etc. required to satisfy execution criteria $f$ may include transaction parameters associated with a transaction.

In some non-limiting embodiments or aspects, transaction data may include parameters associated with a transaction, such as an account identifier (e.g., a PAN, etc.), a transaction amount, a transaction date and time, a type of products and/or services associated with the transaction, a conversion rate of currency, a type of currency, a merchant type, a merchant name, a merchant location, a transaction approval (and/or decline) rate, and/or the like.

As shown in FIG. 3, at step 304, process 300 includes communicating an update request. For example, a client 160 may communicate an update request. As an example, a client 160 may communicate an update request associated with the input data to a node of a plurality of nodes.

In some non-limiting embodiments or aspects, client 160 communicates the update request associated with the input data to the node via another node of the plurality of nodes different than the node. For example, client 160 may be in communication with a non-leader node of an ensemble of nodes, and the non-leader node may communicate the update request from the client to a leader node of the ensemble. As an example, the plurality of nodes may be divided across a plurality of data centers such that each data center of the plurality of data centers includes a subset of nodes of the plurality of nodes, each subset of nodes may include a leader node elected by that subset of nodes, the leader nodes may include a super leader node elected by the leader nodes, and the node may include the leader node of one subset of nodes. In some non-limiting embodiments or aspects, the leader node of the ensemble that receives the update request may include a super leader node.

In some non-limiting embodiments or aspects, the update request includes a request to perform a data entry associated with processing of the input data at a data center including the node.

As shown in FIG. 3, at step 306, process 300 includes receiving an indication. For example, client 160 may receive an indication of whether the update request is successful. As an example, if client 160 receives an indication that the update request failed, processing may proceed to step 308 described herein. In such an example, an indication that the update request failed may be due to another data center (e.g., another node, a node in another ensemble, etc.) having already performed a data entry associated with processing of the same input data. For example, the input data may include transaction data associated with at least one transaction, and the at least one transaction may have been previously processed (e.g., by another client 160, etc.). As an example, if client 160 receives an indication that the update request is successful, processing may proceed to step 312 described herein. In such an example, an indication that the update request is successful may be due to the data center (e.g., a node communicating with the client 160, a leader node in the ensemble including the node communicating with the client 160, etc.) performing a data entry associated with processing of the input data.

As shown in FIG. 3, at step 308, process 300 includes communicating a result request for result data until the result data is received. For example, client 160 may communicate a result request for result data until the result data is received. As an example, client 160 may communicate a result request for result data associated with processing of the input data to the node of the plurality of nodes until the result data associated with processing of the input data is received. In such an example, if the update request fails, the client 160 may trigger another request that will fetch the latest update for a given output id (OID) (e.g., OA, Oft etc.), and if the fetch request is successful, the client may trigger processing with the result of the fetch request. However, if the request fails, the client may retry the fetch request and keep retrying the fetch request until the fetch request is successful in obtaining the result data.

In some non-limiting embodiments or aspects, process 300 including step 308 thereof for communicating a result request for result data may be represented according to the following pseudo code:

1. while(true){
2. if(execution criteria is satisfied){
3. update_result=request_to_create_update_in_ensemble(inputs)
4. if(update_result is successful){
5. trigger_processing(inputs);
6. OID++;
7. }
8. else(update_result is failed){
   a. label fetch:
   b. fetch_result=fetch_info_from_ensemble(OID)
   c. if(fetch result is successful){
   d. trigger_processing(fetch_result);

-continued

```
        e.    increment OID;
        f.    }
        g.    else(fetch result is failed){
        h.    goto fetch;
        i.    }
9.   }
10.  }
11.  }
```

In process 300 and the pseudo code representation thereof, for continued execution, function calls request_to_create_update_in_ensemble and fetch_info_from_ensemble may be served for multiple synchronization ensembles (e.g., one per data center, etc.) to improve disaster recovery.

As shown in FIG. 3, at step 310, process 300 includes processing result data in response to receiving the result data. For example, client 160 may process result data in response to receiving the result data. As an example, client 160 may process, in response to receiving the result data associated with processing of the input data from the node, the result data.

As shown in FIG. 3, at step 312, process 300 includes processing input data. For example, client 160 may process input data. As an example, client 160 may process, in response to receiving the indication that the further update request is successful, the input data. In such an example, client 160 may apply a fraud detection process and/or a stand-in processing process to the input data to determine a fraudulent transaction associated with the input data or an authorization for the transaction associated with the input data.

In some non-limiting embodiments or aspects, client 160 may obtain further input data, communicate a further update request associated with the further input data to the node of the plurality of nodes, receive a further indication that the further update request is successful, and process, in response to receiving the further indication that the further update request is successful, the further input data.

Although embodiments or aspects have been described in detail for the purpose of illustration and description, it is to be understood that such detail is solely for that purpose and that embodiments or aspects are not limited to the disclosed embodiments or aspects, but, on the contrary, are intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect. In fact, any of these features can be combined in ways not specifically recited in the claims and/or disclosed in the specification. Although each dependent claim listed below may directly depend on only one claim, the disclosure of possible implementations includes each dependent claim in combination with every other claim in the claim set.

What is claimed is:

1. A computer-implemented method comprising:
   obtaining, with at least one processor, input data;
   before performing a data entry associated with processing of the input data, communicating, with at least one processor, an update request associated with the input data to a node of a plurality of nodes;
   receiving, with at least one processor, an indication that the update request failed;
   communicating, with at least one processor, a result request for result data associated with processing of the input data to the node of the plurality of nodes until the result data associated with processing of the input data is received; and
   in response to receiving the result data associated with processing of the input data from the node, processing, with at least one processor, the result data,
   wherein the plurality of nodes is divided across a plurality of data centers such that each data center of the plurality of data centers includes a subset of nodes of the plurality of nodes, wherein each subset of nodes includes a leader node elected by that subset of nodes, wherein the leader nodes include a super leader node elected by the leader nodes, and wherein the node includes the leader node of one subset of nodes of a data center of the plurality of data centers,
   wherein the input data is received via a client of a plurality of clients, wherein each client of the plurality of clients is simultaneously executing a same service, and wherein the update request includes a request to perform the data entry associated with processing of the input data at the data center including the node, and
   wherein the indication that the update request failed is due to another data center of the plurality of data centers different than the data center having already performed a data entry associated with previous processing of the same input data by another client of the plurality of clients different than the client.

2. The computer-implemented method of claim 1, wherein the update request associated with the input data is communicated to the node via another node of the plurality of nodes different than the node.

3. The computer-implemented method of claim 1, wherein the node includes the super leader node.

4. The computer-implemented method of claim 1, further comprising:
   obtaining, with at least one processor, further input data;
   communicating, with at least one processor, a further update request associated with the further input data to the node of the plurality of nodes;
   receiving, with at least one processor, a further indication that the further update request is successful; and
   in response to receiving the further indication that the further update request is successful, processing, with at least one processor, the further input data.

5. The computer-implemented method of claim 1, wherein the input data includes transaction data associated with at least one transaction, and wherein the at least one transaction was previously processed by the another client of the plurality of clients different than the client.

6. A system, comprising:
   one or more processors programmed and/or configured to:
      obtain input data;
      before performing a data entry associated with processing of the input data, communicate an update request associated with the input data to a node of a plurality of nodes;
      receive an indication that the update request failed;
      communicate a result request for result data associated with processing of the input data to the node of the plurality of nodes until the result data associated with processing of the input data is received; and
      in response to receiving the result data associated with processing of the input data from the node, process the result data,
   wherein the plurality of nodes is divided across a plurality of data centers such that each data center of the plurality of data centers includes a subset of nodes of the plurality of nodes, wherein each subset of nodes includes a leader node elected by that subset of nodes, wherein the leader nodes include a super leader node elected by the leader nodes, and wherein the node includes the leader node of one subset of nodes of a data center of the plurality of data centers, wherein the input data is received via a client of a plurality of clients, wherein each client of the plurality of clients is simultaneously executing a same service, and wherein the update request includes a request to perform the data entry associated with processing of the input data at the data center including the node, and wherein the indication that the update request failed is due to another data center of the plurality of data centers different than the data center having already performed a data entry associated with previous processing of the same input data by another client of the plurality of clients different than the client.

7. The system of claim 6, wherein the update request associated with the input data is communicated to the node via another node of the plurality of nodes different than the node.

8. The system of claim 6, wherein the node includes the super leader node.

9. The system of claim 6, wherein the one or more processors are further programmed and/or configured to:
obtain further input data;
communicate a further update request associated with the further input data to the node of the plurality of nodes;
receive a further indication that the further update request is successful; and
in response to receiving the further indication that the further update request is successful, process the further input data.

10. The system of claim 6, wherein the input data includes transaction data associated with at least one transaction, and wherein the at least one transaction was previously processed by the another client of the plurality of clients different than the client.

11. A computer program product comprising at least one non-transitory computer-readable medium including program instructions that, when executed by at least one processor, cause the at least one processor to:
obtain input data;
before performing a data entry associated with processing of the input data, communicate an update request associated with the input data to a node of a plurality of nodes;
receive an indication that the update request failed;
communicate a result request for result data associated with processing of the input data to the node of the plurality of nodes until the result data associated with processing of the input data is received; and
in response to receiving the result data associated with processing of the input data from the node, process the result data, wherein the plurality of nodes is divided across a plurality of data centers such that each data center of the plurality of data centers includes a subset of nodes of the plurality of nodes, wherein each subset of nodes includes a leader node elected by that subset of nodes, wherein the leader nodes include a super leader node elected by the leader nodes, and wherein the node includes the leader node of one subset of nodes of a data center of the plurality of data centers, wherein the input data is received via a client of a plurality of clients, wherein each client of the plurality of clients is simultaneously executing a same service, and wherein the update request includes a request to perform the data entry associated with processing of the input data at the data center including the node, and wherein the indication that the update request failed is due to another data center of the plurality of data centers different than the data center having already performed a data entry associated with previous processing of the same input data by another client of the plurality of clients different than the client.

12. The computer program product of claim 11, wherein the update request associated with the input data is communicated to the node via another node of the plurality of nodes different than the node.

* * * * *